(12) United States Patent
Bai et al.

(10) Patent No.: US 10,863,547 B2
(45) Date of Patent: Dec. 8, 2020

(54) ADAPTING TIMING ADVANCE FOR MULTIPLE RACH TRANSMISSION IN BACKHAUL NETWORKS

(71) Applicant: QUALCOMM Incorporated, San Diego, CA (US)

(72) Inventors: Tianyang Bai, Bridgewater, NJ (US); Navid Abedini, Somerset, NJ (US); Juergen Cezanne, Ocean Township, NJ (US); Muhammad Nazmul Islam, Edison, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 31 days.

(21) Appl. No.: 16/180,825

(22) Filed: Nov. 5, 2018

(65) Prior Publication Data

US 2019/0141755 A1 May 9, 2019

Related U.S. Application Data

(60) Provisional application No. 62/583,953, filed on Nov. 9, 2017.

(51) Int. Cl.
*H04W 74/08* (2009.01)
*H04L 5/00* (2006.01)
*H04W 24/08* (2009.01)
*H04W 24/02* (2009.01)
*H04W 56/00* (2009.01)

(52) U.S. Cl.
CPC ....... *H04W 74/0833* (2013.01); *H04L 5/0048* (2013.01); *H04W 24/02* (2013.01); *H04W 24/08* (2013.01); *H04W 56/0045* (2013.01)

(58) Field of Classification Search
CPC . H04W 74/0833; H04W 24/08; H04W 24/02; H04W 56/0045; H04L 5/0048
See application file for complete search history.

(56) References Cited

U.S. PATENT DOCUMENTS

| | | | |
|---|---|---|---|
| 2013/0188580 A1 | 7/2013 | Dinan | |
| 2015/0078310 A1* | 3/2015 | Kreuzer | H04W 52/245 370/329 |
| 2017/0013443 A1* | 1/2017 | Gopalakrishnan | H04W 8/186 |
| 2017/0041815 A1* | 2/2017 | Fernandez Arboleda | H04W 24/08 |
| 2017/0048732 A1* | 2/2017 | Shekalim | H04B 7/15507 |
| 2017/0164377 A1* | 6/2017 | Ho | H04W 16/28 |

(Continued)

FOREIGN PATENT DOCUMENTS

| EP | 2365717 A1 | 9/2011 |
| EP | 2469942 A1 | 6/2012 |
| EP | 2557867 A1 | 2/2013 |

OTHER PUBLICATIONS

International Search Report and Written Opinion—PCT/US2018/059415—ISA/EPO—dated Feb. 25, 2019.

*Primary Examiner* — Ajay Cattungal
(74) *Attorney, Agent, or Firm* — Arent Fox, LLP

(57) ABSTRACT

A method, an apparatus, and a computer readable medium for identifying a first timing advance (TA) value in response to receiving a synchronization signal (SS), transmitting the RACH signal based on the first TA value on a first resource to a wireless device, identifying a second TA value, and transmitting the RACH signal based on the second TA value on a second resource to the neighboring base station.

30 Claims, 6 Drawing Sheets

(56) References Cited

U.S. PATENT DOCUMENTS

| | | | |
|---|---|---|---|
| 2018/0254825 A1* | 9/2018 | Speidel | H04B 7/2123 |
| 2018/0270682 A1* | 9/2018 | Zacharias | H04W 74/0833 |
| 2018/0270699 A1* | 9/2018 | Babaei | H04W 72/0453 |
| 2018/0270700 A1* | 9/2018 | Babaei | H04L 47/826 |
| 2018/0270713 A1* | 9/2018 | Park | H04W 28/18 |
| 2018/0270791 A1* | 9/2018 | Park | H04W 8/24 |
| 2018/0279229 A1* | 9/2018 | Dinan | H04W 52/146 |
| 2018/0310321 A1* | 10/2018 | Basu Mallick | H04W 48/16 |
| 2019/0124572 A1* | 4/2019 | Park | H04W 72/0446 |

* cited by examiner

ADAPTING TIMING ADVANCE FOR MULTIPLE RACH TRANSMISSION IN BACKHAUL NETWORKS

CROSS-REFERENCE TO RELATED APPLICATIONS

The current application claims priority to United States Provisional Application No. 62/583,953, entitled "Adapting Timing Advance for Multiple RACH Transmission in Backhaul Networks," filed on Nov. 9, 2017, the content of which is incorporated by reference in its entirety.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

Random access channel (RACH) signal plays an important role for an unsynchronized device to be synchronized in networks. This may occur in the case of initial access after link/beam failure in millimeter wave (mmW) systems. RACH signals may be sent in response to a synchronization signal (SS) indicating a device attempting to join a network. Therefore, there is a desire for a method and an apparatus to improve transmission response time and efficiency when wireless devices exchange SS and RACH signals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for transmitting RACH signals from a wireless device includes identifying a first timing advance (TA) value, transmitting the RACH signal based on the first TA value on a first resource to a second wireless device, identifying a second TA value, and transmitting the RACH signal based on the second TA value on a second resource to the second wireless device.

A wireless device for transmitting RACH signals includes a memory storing instructions, a transceiver, and one or more processors coupled to the memory and the transceiver, and configured to execute the instructions to identify a first timing advance (TA) value, transmit the RACH signal based on the first TA value on a first resource to a second wireless device, identify a second TA value, and transmit the RACH signal based on the second TA value on a second resource to the second wireless device.

A computer readable medium including instructions that, when executed by one or more processors, cause the one or more processor to identify a first timing advance (TA) value, transmit the RACH signal based on the first TA value on a first resource to a second wireless device, identify a second TA value, and transmit the RACH signal based on the second TA value on a second resource to the second wireless device.

An apparatus for transmitting RACH signals includes means for identifying a first timing advance (TA) value, means for transmitting the RACH signal based on the first TA value on a first resource to a second wireless device, means for identifying a second TA value, and means for transmitting the RACH signal based on the second TA value on a second resource to the second wireless device.

A method for receiving RACH signals from a wireless device includes transmitting a synchronization signal at a first time to a remote wireless device, wherein the remote wireless device is a distance away from the wireless device, searching for a RACH signal during an observation window including a second time that is a delta time after the first time, wherein the delta time is a predetermined time interval between a receiving time indicating the remote wireless device receiving the synchronization signal from the wireless device and a scheduled time for transmitting the RACH signal to the wireless device in response to the synchronization signal, and receiving the RACH signal from the remote wireless device at the second time, wherein the remote wireless device sends the RACH signal a timing advance before the scheduled time.

A wireless device for transmitting RACH signals includes a memory storing instructions, a transceiver, and one or more processors coupled to the memory and the transceiver, and configured to execute the instructions to transmit a synchronization signal at a first time to a remote wireless device, wherein the remote wireless device is a distance away from the wireless device, search for a RACH signal during an observation window including a second time that is a delta time after the first time, wherein the delta time is a predetermined time interval between a receiving time indicating the remote wireless device receiving the synchronization signal from the wireless device and a scheduled time for transmitting the RACH signal to the wireless device in response to the synchronization signal, and receive the RACH signal from the remote wireless device at the second time, wherein the remote wireless device sends the RACH signal a timing advance before the scheduled time To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
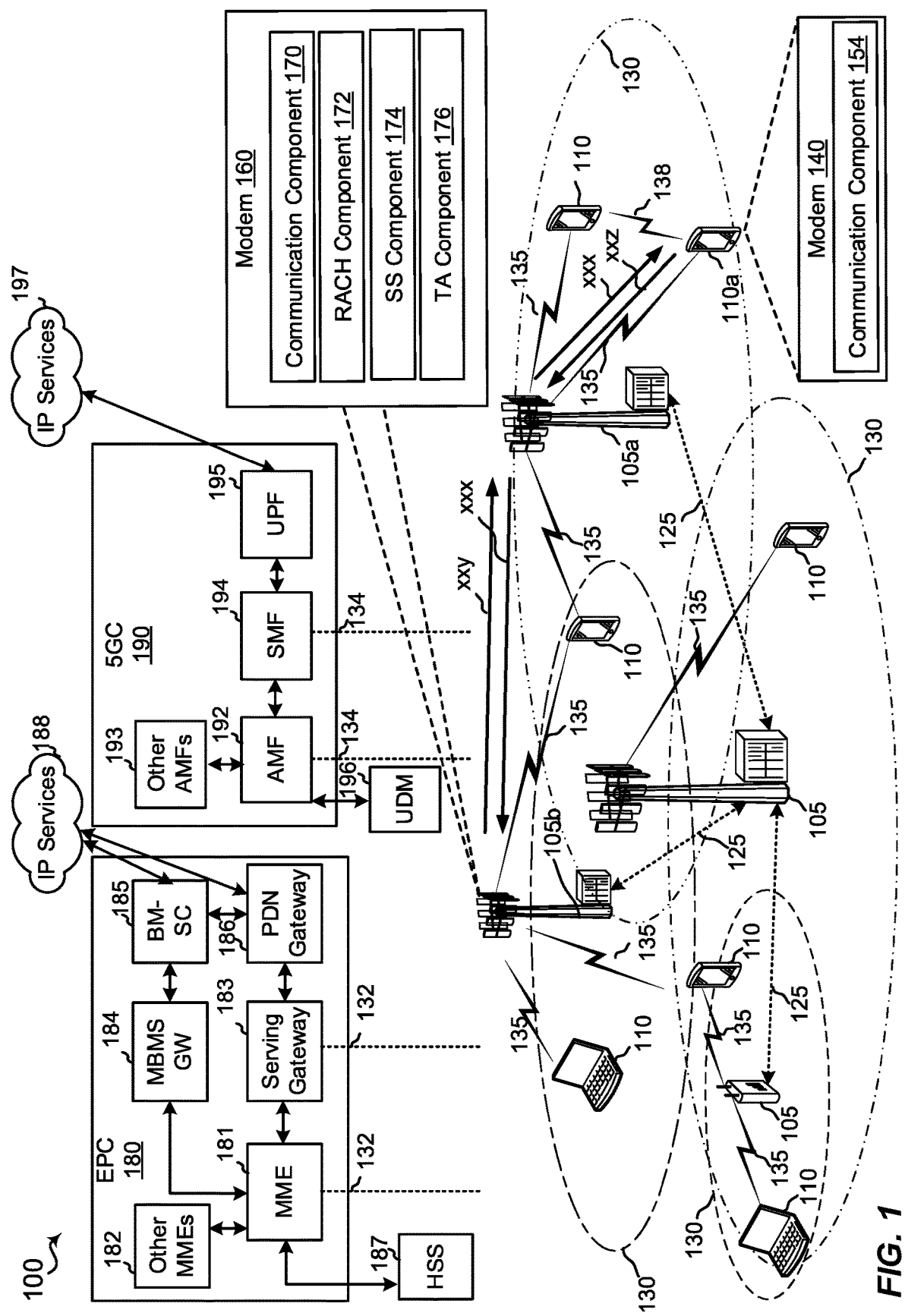
FIG. 1 is a schematic diagram of an example of a wireless communication network including base stations that may perform a RACH procedure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects, a first wireless device, such as a user equipment (UE) or a base station (BS), may send out RACH signals in response to synchronization signals (SS) from a second wireless device, such as a neighboring BS. The exchange of SS and RACH signals between wireless devices may provide a more robust network, such as but not limited to enabling an initial access procedure where an unsynchronized UE or BS may communicate with the neighboring BS that is in a synchronized network. According to the present disclosure, in order for the RACH signals transmitted by the UE or BS to arrive at the neighboring BS with minimum delay, the UE or BS may send out the RACH signals according to a timing advance (e.g., a transmit time prior to a typical or scheduled response time, such as but not limited to a known delay period). For example, the use of the timing advance may reduce delay in receiving transmissions between devices that are physically located a relatively far distance from one another (e.g., up to kilometers apart), such as a typical distance between a UE at the edge of the cell of a BS, or a typical distance between two BSs in a backhaul network. The amount of timing advance may depend on one or more of the round-trip time (RTT) of the SS and RACH signals (e.g., greater RTT leads to a greater value of the timing advance), the distance between the UE or BS and the neighboring BS (e.g., greater distance leads to a greater value of the timing advance), and/or other predefined methods. According to some aspects, the UE or BS may attempt different timing advance (TA) values until a RACH signal is successfully received by the neighboring BS. In certain cases, a BS in one tier may receive a RACH from another BS in another tier for robustness. Also in backhaul systems, a relatively shorter preamble for the RACH signal transmitted by a BS (as compared to a preamble of a RACH transmitted by a UE to a BS) may be sufficient to distinguish the BS relative to other BSs because the potential number of base stations may be lower than the number of UEs (and thus, potentially, the relatively fewer BSs will be less likely to use conflicting preambles). Also, the use of such relatively shorter preambles may help to reduce the delay in receiving the transmitted RACH. Additionally, in aspects where an appropriate timing advance is applied to control timing of transmitting the RACH, then the RACH may be transmitted with a relatively shorter cyclic prefix (CP) and/or a relatively shorter guard time (GT) as compared to current RACH configurations (which may increase the length of the CP and/or GT based on increasing RTT), which may help to reduce delay in receiving the RACH (and in subsequent data transmissions) and/or which may help to improve power efficiency (by reducing transmission time of the relatively shorter length RACH of the present aspects).

Additional features of the present aspects are described in more detail below with respect to FIGS. 1-6.

It should be noted that the techniques described herein may be used for various wireless communication networks such as CDMA, TDMA, FDMA, OFDMA, SC-FDMA, 4G/LTE, 5G or New Radio (NR), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 502.11 (Wi-Fi), IEEE 502.16 (WiMAX), IEEE 502.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., 4G/LTE, 5G/NR) communications over a shared radio frequency spectrum band.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, the wireless communication network 100 may include one or more base stations 105a, 105b, one or more user equipment (UEs) 110, and an Evolved Packet Core (EPC) 180 and/or a 5G Core (5GC) 190. In an example of an implementation of this disclosure in a backhaul network, the base station 105b may receive a synchronization signal (SS) xxx from the base station 105a and send a RACH signal xxy in response to the SS xxx. In order for the base station 105a to receive the RACH signal xxy within its observation window, the base station 105b may send the RACH signal xxy prior to a scheduled transmission time, such as based on a timing advance (TA) value, to account for the round trip time (RTT) relating to the transmissions of the SS xxx and the RACH signal xxy. Similarly, in an example implementation for the UE 110a at the edge of the cell or coverage area 130 of the base station 105a, the UE 110a may receive the (SS) xxx from the base station 105a and send the RACH signal xxz in response to the SS xxx. In order for the base station 105a to receive the RACH signal xxz within its observation window, the UE 110a may send the RACH signal xxz prior to a scheduled transmission time, such as based on a timing advance (TA) value, to account for the round trip time (RTT) relating to the transmissions of the SS xxx and the RACH signal xxz. The RACH signal xxz transmitted by the UE 110a may be different from the RACH signal xxy transmitted by the BS 105b, for example, based on having different configurations, different preambles (e.g., the preamble used by BS 105b may be shorter in length), and/or different cyclic prefix (CP) and/or guard time (GT) formats.

The UE 110 may include a modem 140 and a communication component 154 configured to send and/or receive data via transceivers within the UE 110. As described in more detail in FIG. 6, the UE 110 may include additional components to enable receiving the SS xxx from the base station 110, determining a timing advance, and transmitting the RACH signal xxz based on the timing advance to the base station 110, as described herein. For example, the UE 110 may include an SS component 156 configured to receive and decode the SS xxx, a TA component 157 configured to determine a timing advance value, and a RACH component 155 configured to generate the RACH signal xxz and transmit it based on the timing advance.

The base stations 105a, 105b may each include a modem 160 and a communication component 170 configured to transmit/receive SS xxx and/or RACH signals xxy. The base stations 105a, 105b may each include a SS component 174 configured to generate SS xxx. The base stations 105a, 105b may each include a RACH component 172 configured to generate RACH signals xxy. The base stations 105a, 105b may each include a TA component 176 configured to determine a TA prior to transmitting the RACH signal xxy. The base station 105a may include similar or different components as the base station 105b.

The modems 140, 160 may be configured to communicate via a cellular network, a Wi-Fi network, or other wireless and wired networks. The modems 140, 160 may receive and transmit data via transceivers.

The EPC 180 or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate directly or indirectly (e.g., through EPC 180 or the 5GC 190), with each other over backhaul links 132, 134 (e.g., X2 interfaces). The backhaul links 132, 134 may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies)

modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with the UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations 105, such as gNB 180 may operate in a traditional sub 6 GHz spectrum, in millimeter wave (mmW) frequencies and/or near mmW frequencies in communication with the UE 110. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming with the UEs 110 to compensate for the extremely high path loss and short range.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
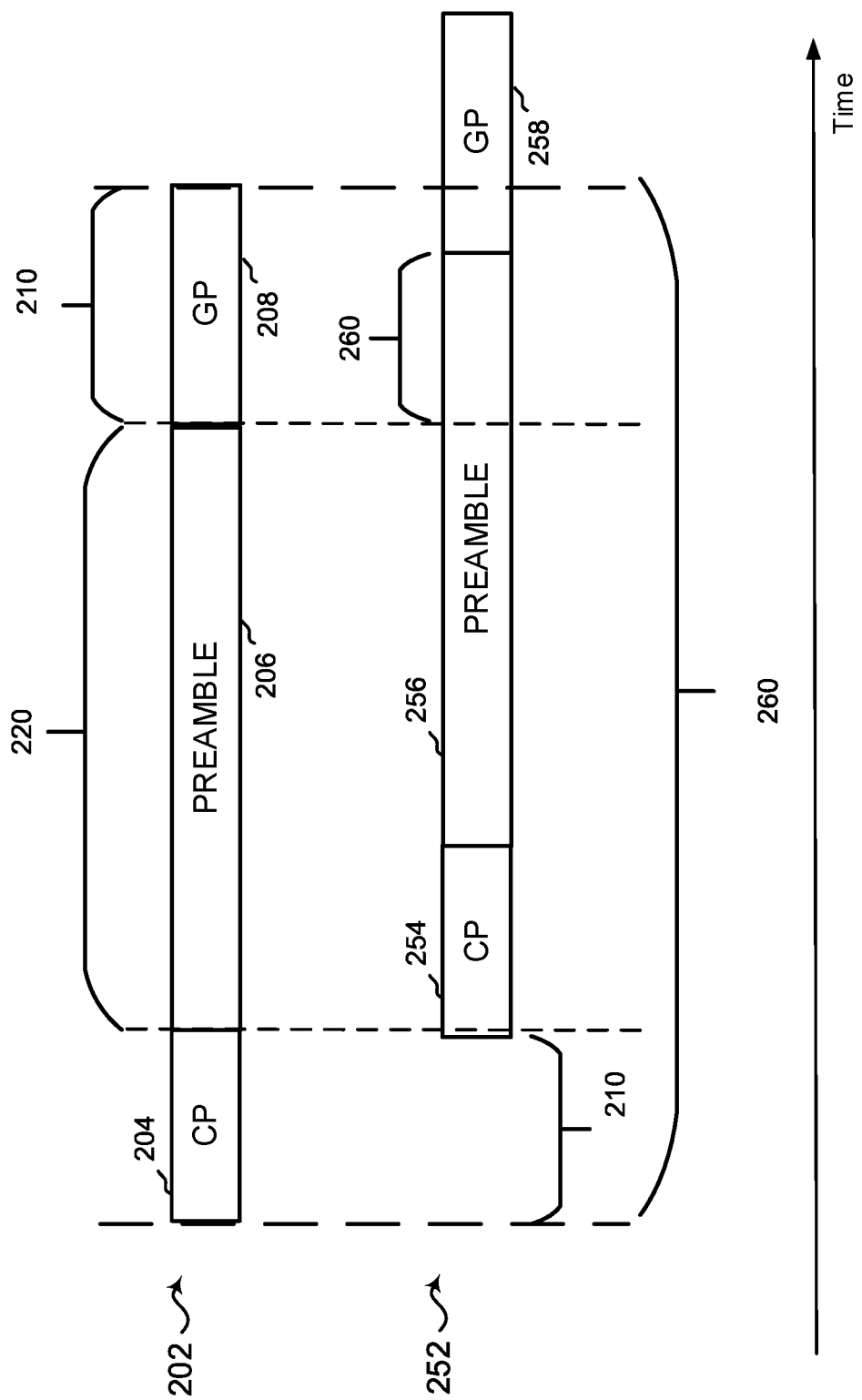
FIG. 2 is a block diagram of different examples of RACH signals.

Referring to FIG. 2, RACH signals 202 and 252 may be sent by nearby and distant wireless devices, respectively, such as UEs 110 and/or BSs 105a, 105b. Since round-trip time of messages transmitted between wireless devices may be different depending on the relative location and/or relative distance between the devices, differently formatted cyclic prefix (CP) and/or guard time (GT) may be utilized for the RACH signals 202 and 252 to help ensure that at least one preamble sequence falls within an observation interval of the receiver of the RACH signal. In some implementations, the RACH signal 252 may be longer than the RACH signal 202. In conventional backhaul systems, BS-to-BS distance may be longer than most BS-to-UE distances, which leads to longer round trip time (RTT) for transmissions among base stations. The longer RTT may lead to a RACH signal from a far BS to fall beyond the observation window of the receiving BS. Therefore, this could lead to extending the durations of CP and GT so the receiving BS may properly decode the RACH signal. However, extended CP and GT durations may require the receiver of the RACH to delay response time in a backhaul system and to expend more power.

In conventional implementations, the BS 105a may receive the RACH signal 202 from a relatively physically nearby device (e.g., UE 110a) and the RACH signal 252 from a relatively physically distant device (e.g., BS 105b). The RACH signal 202 may include a CP 204, a preamble 206, and a GT 208. The RACH signal 252 may include a CP 254 and a preamble 256, and a GT 258. The BS 105a may listen for RACH signals during a receiver observation window 220 of a certain duration (e.g., 1 millisecond (ms), 2 ms, 5 ms, 10 ms, 20 ms, 50 ms, 100 ms, 200 ms, 500 ms, etc.). The CP may include repetitive portions of the preamble. In some examples, the CP 254 and the GT 258 of the RACH signal 252, individually or collectively, may be larger than or equal to (in duration) a maximum RTT 210 so the RACH signals 202, 252 having different RTTs from various devices (e.g. UE 110a and BS 105b) may be decoded properly during the observation window 220. In some implementations, the CP 204 and the GT 208 of the RACH signal 202, and/or the CP 254 and GT 208 (not shown) of the RACH signal 252, may each have the same value (each of which is larger than or equal to (in duration) the maximum RTT 210). As such, an example of a RACH slot duration 260 may be the maximum RTT 210×2+a length of the preamble 206 or 256. In some implementations, the RACH slot duration 260 may be 100 microseconds (μs), 200 μs, 500 μs, 1 ms, 2 ms, 5 ms, 10 ms, 20 ms, 50 ms, 100 ms, 200 ms, 500 ms, etc. In other words, by formatting the RACH signal such that CP=GT=Maximum RTT, then a RACH signal sent by either a close or far away device may be received within an observation window/RACH slot duration so that the preamble can be decoded.

Still referring to FIG. 2, in a non-limiting example, a portion 260 of the preamble 256 for the RACH signal 256 may fall beyond the observation window 220 due to delays by the RTT 210. In conventional implementations, at least some data in the portion 260 of the preamble 256 may be repeated in the CP 254 of the RACH signal 256. Since at least some of the CP 254 falls within the observation window 220, the receiving BS, such as the BS 105a, may be able to decode the preamble 256 properly even though the portion 260 of the preamble 256 falls beyond the observation window 220. The CP 254 may be longer than the CP 204 to compensate for the delays (i.e., the RTT 210). Similarly, the GT 258 may be longer than the GT 208. In some implementations, the CP 204 may have a different configuration (e.g., length) than the CP 254. The preamble 206 may have a different configuration (e.g., length) than the preamble 256. The GT 208 may have a different configuration (e.g., length) than the GT 258. In some non-limiting examples, the combined length of the CP 204, preamble 206, and GT 208 may be shorter or longer than the combined length of the CP 254, preamable 256, and GT 258.

Figure 3:
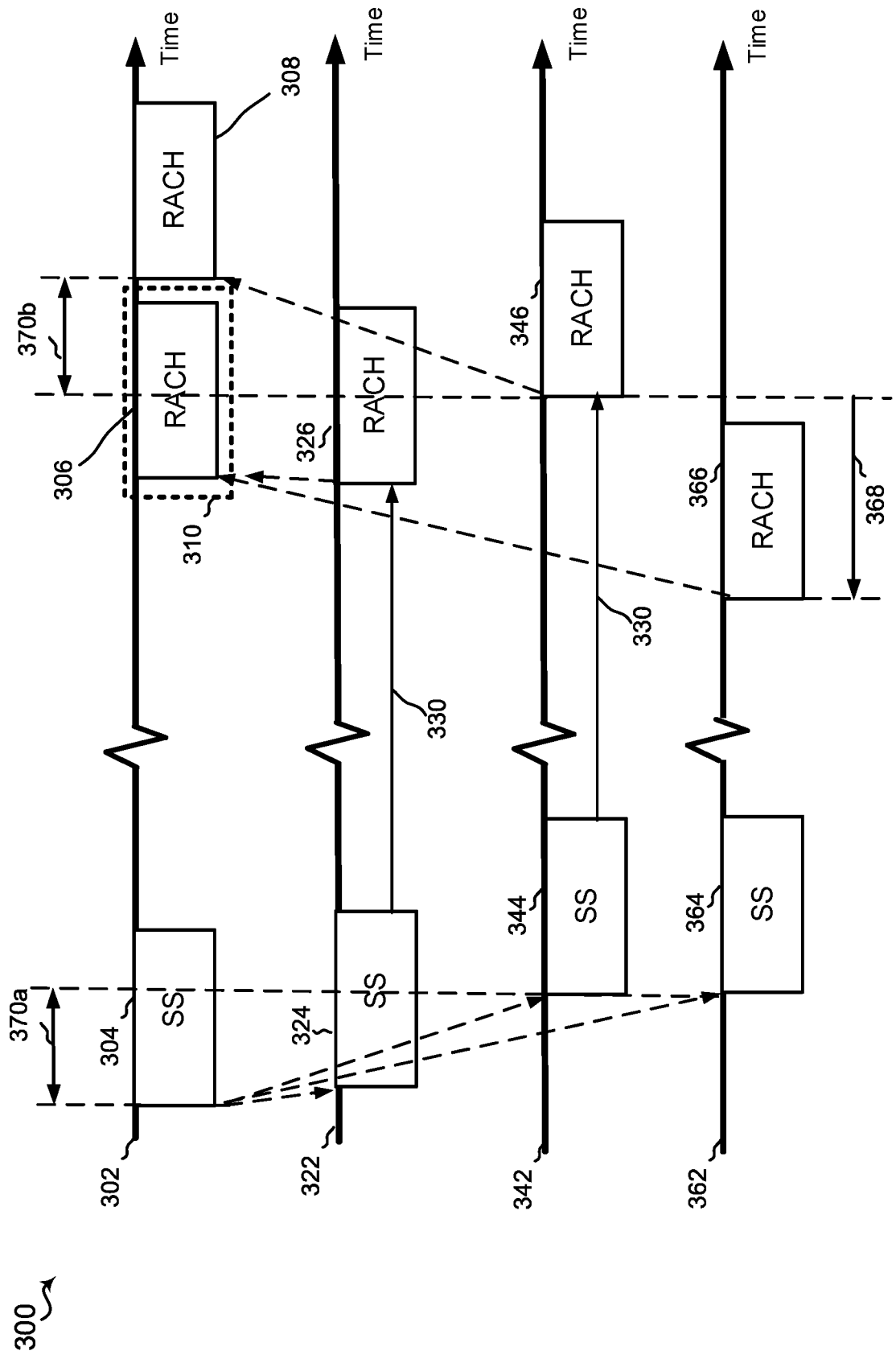
FIG. 3 includes different examples of timing diagrams of the transmission and reception of RACH signals.

Referring to FIG. 3, example timing diagrams 302, 322, 342, and 362 may be used for RACH signal transmission and reception, where the use of a timing advance (TA) 368 by relatively distant devices may help ensure reception of RACH signals within an observation window 310 according to aspects of the present disclosure. The timing diagram 302 is associated with a device transmitting synchronization signals (SS) 304 and listening for RACH signals in response. The timing diagram 322 is associated with a device located relatively close to the device transmitting the SS 304, e.g., such that there is a zero or near zero RTT between the devices. The timing diagrams 342 and 362 are associated with respective devices located relatively far away (e.g., a BS to BS backhaul distance, or a UE at a cell edge) from the device transmitting the SS 304, e.g., such that the RTT between the devices may affect whether or not the corresponding RACH signal is received within the observation window 310. In particular, the timing diagram 342 illustrates the case where the corresponding RACH signal is received outside of the observation window 310, while timing diagram 362 illustrates the case where the TA 368 is used to account for a non-zero RTT to help ensure the corresponding RACH signal is received within the observation window 310.

In particular, timing diagram 302 includes a duration of the transmission of the SS 304 by a device, such as the base station 105a, the observation window 310 having a duration within which the base station 105a listens for responses, and the reception of RACH signal 306, 308 by the base station 105a. In this case, received RACH signal(s) 306 may be one or more RACH signals transmitted by one or more devices in response to the SS 304 and received within the observation window 310, such as a RACH signal transmitted by a distantly located (e.g., cell edge) device using a timing advance as described herein. In contrast, in this case, received RACH signal(s) 308 may be one or more RACH signals transmitted by one or more devices in response to the SS 304 and received outside of the observation window 310, such as a RACH signal transmitted by a distantly located (e.g., cell edge) device that fails to use a timing advance as described herein. Further, the observation window 310 may be spaced apart, in time, from the transmission of the SS 304. In some cases, the time duration between the transmission of the SS 304 and the observation window 310 may be the same as, or may a function of or related to, a wait time or a delay time 330 used by devices responding to the SS 304.

The timing diagram 322 includes the reception of the SS 304, as denoted by received SS 324, by a nearby device, such as the UE 110 that is located relatively close to the BS 110 that transmitted the SS 324, and, in response, the transmission of a RACH signal 326 after the wait time 330. The RACH signal 326 is received as the RACH signal 306 within the observation window 310 due to the relatively short RTT between the devices. In this case, the timing diagram 322 of the nearby device may be representative of a timing for a device located relatively close to the device transmitting SS 304, e.g., such that a RTT between the devices is zero or near zero.

The timing diagram 342 includes the reception of the SS 304, as denoted by received SS 344, for instance by a relatively distantly located device (e.g., at a cell edge or by a BS in a backhaul network), such as base station 105b or UE 110a. Further, and in response to the received SS 344, the timing diagram 342 includes the transmission of RACH signal 346 by the distant device, such as the base station 105b or UE 110a, after the wait time 330 and without TA 368 such that the corresponding received RACH signal 308 is received outside of the observation window 310.

To address the issues with timing diagram 342, the timing diagram 362 according to the present disclosure utilizes a timing advance (TA) 368 for transmitting RACH signals. For example, the timing diagram 362 includes the reception of the SS 304, denoted as received SS 364, and, in response, the transmission of a RACH signal 366 by a distant device using TA 368, such that the resulting received signal 306 (at the device transmitting the SS 304) is within the observation window 310. In other words, according to the timing diagram 362, the base station 105b or UE 110a may advance the transmission time relative to the wait time 330 by at least the minimum or maximum RTT, or 2 times the RTT, so the RACH signal 366 transmitted by the base station 105b or UE 110a may be sent earlier so as to fall within the observation window 310 of the base station 105a that sent out the SS 304. In some examples, utilizing TA 368 by advancing a timing of the transmission by a value or multiple of the RTT may allow for using shortened values for the CP and GT.

More specifically, still referring to FIG. 3, the base station 105a may transmit the SS 304 to a closely-located UE 110. The UE 110 may be nearby the base station 105a. In a non-limiting example, the UE 110 may be within 10 meters (m), 20 m, 50 m, 100 m, 200 m, 500 m, or 1000 m of the base station 105a. The UE 110 may receive the SS 324 after the transmission of the SS 304, such as 33 nanoseconds (ns), 67 ns, 167 ns, 333 ns, 667 ns, 1.7 ms, or 3.3 ms, etc. The UE 110 may transmit the RACH signal 326 back to the base station 105a after the SS 324 by, for example, after waiting a duration of the wait time 330 (e.g., 1 ms, 2 ms, 5 ms, 10 ms, 20 ms, 50 ms, 100 ms, etc.). The base station 105a may receive the RACH signal 306 corresponding to the transmission of the RACH 326, such as 33 nanoseconds (ns), 67 ns, 167 ns, 333 ns, 667 ns, 1.7 ms, or 3.3 ms, etc. The base station 105a may receive the RACH signal 306 partially or completely within the observation window 310.

Still referring to FIG. 3, in an example where TA is not implemented, the base station 105a may transmit the SS 304 to a relatively far away device, such as the base station 105b in a backhaul network with the base station 105a, or such as the UE 110a at the end of the cell or coverage area 130 of the base station 105a. In some examples, the base station 105b or the UE 110a may be located a distance away from the base station 105a of 1 kilometer (km), 2 km, 5 km, 10 km, 20 km, 50 km, 100 km, or any distance where a RTT of messages sent between the devices is non-zero. The base station 105b or UE 110a may receive the SS 344 after the transmission of the SS 304, such as after a delay of 3.3 µs, 6.7 µs, 16.7 µs, 33.3 µs, 66.7 µs, 167 µs, or 333 µs. In response to receiving the SS 344, the base station 105b or UE 110a may transmit the RACH 346 after waiting the wait time 330 to the base station 105a. The base station 105a may receive the RACH 308 after the transmission of the RACH 346, such as after a delay of 3.3 µs, 6.7 µs, 16.7 µs, 33.3 µs, 66.7 µs, 167 µs, or 333 µs. Because of the delay due to the RTT, the base station 105a may receive the RACH 308 partially or completely outside the observation window 310. In this case, the RTT 370 may include a forward trip time 370a and a return trip time 370b. The forward trip time 370a may indicate the time from the transmission of the SS 304 by the base station 105a to the reception of the SS 344 by the base station 105b or UE 110a. The return trip time 370b may indicate the time from the transmission of the RACH 346 by the base station 105b or UE 110a to the reception of the RACH 308 by the base station 105a. The RTT 370 may depend on the distance between the base stations 105a and the base station 105b or UE 110a, the transmission medium between the devices, and/or the technology used for transmission of the SS and/or RACH signals.

Still referring to FIG. 3, in an example where TA is implemented, the base station 105a may transmit the SS 304 to the relatively far away device, e.g., base station 105b or UE 110a. In some examples, the base station 105b or UE 110a may be 1 kilometer (km), 2 km, 5 km, 10 km, 20 km, 50 km, or 100 km from the base station 105a. The base station 105b or UE 110a may receive the SS 364 after the transmission of the SS 304, such as after a delay of 3.3 µs, 6.7 µs, 16.7 µs, 33.3 µs, 66.7 µs, 167 µs, or 333 µs. In response to receiving the SS 364, the base station 105b or UE 110a may transmit the RACH 366 to the base station 105a. The base station 105b or UE 110a may identify a timing advance 368, and transmit the RACH 366 before waiting the full delay 330, e.g., earlier than the RACH 346, by an amount of the timing advance 368. For example, the base station 105b or UE 110a may identify a value of 100 µs, 200 µs, 500 µs, 1 ms, 2 ms, 5 ms, 10 ms, 20 ms, 50 ms, or 100 ms for the timing advance 368. Due to the introduction of the timing advance 368 and moving up the transmission of the RACH 366, the base station 105a may receive the RACH signal 306 partially or completely within the observation window 310. The timing advance 368 may allow the base station 105a to receive RACH signals from devices relatively far away (e.g., base station 105b in a backhaul network, or UE 110a at an edge of the cell or coverage area 130 of base station 105a) without utilizing multiple observation windows, widening the observation window 310, or requiring the base station 105b or UE 110a to transmit RACH signals with extended CP and/or GP. In other words, the TA 368 may account for both the delay (e.g., the forward trip time 370a) in receiving SS 364 at the base station 105b or UE 110a, and the delay (e.g., the return trip time 370b) in receiving the RACH signal 346 by the base station 105a, which corresponds to the RTT 370 for messages sent between the devices.

In some implementations, the base station 105b or UE 110a may determine the timing advance 368 based on the distance (i.e., estimated round trip time) between the base station 105b or UE 110a and the base station 105a. In some examples, the base station 105b or UE 110a may receive a value of the timing advance 368 from the base station 105a. In other examples, the base station 105b or UE 110a may search in a look-up table or rely on historical data (stored locally) to determine a value of the timing advance 368. In yet another example, the base station 105b or UE 110a may determine a value of the timing advance 368 by trial and error. The base station 105b or UE 110a may attempt different values for the timing advance 368 and select the value of the timing advance 368 that allows the base station 105a to properly decode the RACH signal 306. In yet another example, the base station 105*b* or UE 110*a* may iteratively refine a value of the timing advance 368 such as changing the value until the RACH signal 306 falls completely within the observation window 310, as indicated by receiving a confirmation from the base station 105*a*. In some examples, the base station 105*b* or UE 110*a* may use detected reference signals from the base station 105*a* to generate a value for the timing advance 368. For example, the base station 105*a* may send one or more reference signals to the base station 105*b* or the UE 110*a*. The base station 105*b* or UE 110*a* may use the time for the reference signals to travel from the base station 105*a* to the base station 105*b* or UE 110*a* to determine the timing advance 368. Specifically, the timing advance 368 may be twice the travelling time of the reference signals. In an example, the timing advance 368 may be estimated to be the RTT 370. Other methods of determining a value of the timing advance 368 are possible.

In non-limiting examples, the UE 110*a* may implement TA based on the descriptions above. The UE 110*a* may rely on a certain value for the TA so the transmitted RACH falls partially or completely within the observation window 310 of the base station 105*a*.

Figure 4:
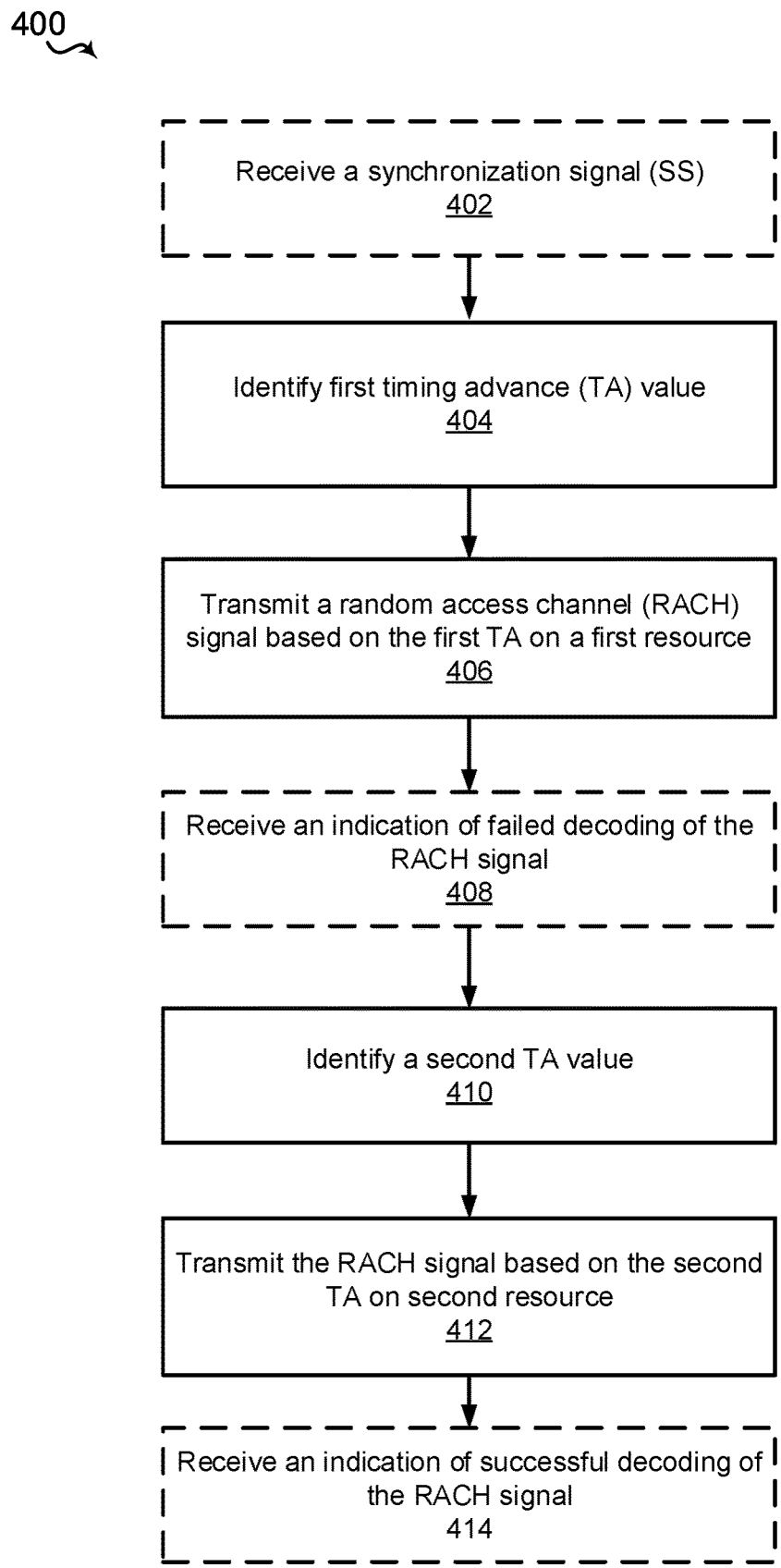
FIG. 4 is a flow diagram of an example of a method of transmitting RACH signals.

Referring to FIG. 4, for example, a method 400 of transmitting RACH signal with TA may be used by a device located relatively far away from a base station transmitting a SS. For example, in one implementation, the method 400 may be operated by the base station 105*b*, which neighbors base station 105*a* in a backhaul network, based on execution of the communication component 170,*the* RACH component 172, the SS component 174, and/or the TA component 176 according to the above-described aspects and according to one or more of the herein-defined actions. The one or more processors 512, in conjunction with the communication component 170, the RACH component 172, the SS component 174, and/or the TA component 176 of the base station 105*b* may perform the one or more of the herein-defined actions. In another implementation, for example, the method 400 may be operated by the UE 110*a*, e.g., located at or near an edge of the cell or coverage area 130 of the base station 105*a*, based on the execution of the communication component 170,*the* RACH component 172, the SS component 174, and/or the TA component 176 according to the above-described aspects and according to one or more of the herein-defined actions. The one or more processors 512, in conjunction with the communication component 170, the RACH component 172, the SS component 174, and/or the TA component 176 of the UE 110*a* may perform the one or more of the herein-defined actions.

At block 402, the method 400 may optionally receive a synchronization signal from a neighboring base station. For example, the communication component 170 of the base station 105*b* may receive the SS 364 from the base station 105*a* to initiate the synchronization process as described above with respect to FIG. 3. In particular, the SS 364 may be received by one or more antennas (for wireless signals) or communication interfaces (for wired interfaces) of the base station 105*b*. RF front end and/or transceiver/receiver may process the received wireless/wired signals into digital data and may transfer the digital data to the modem 160 and/or the communication component 170. Alternatively, the UE 110*a* may optionally receive a SS in a similar manner from a wireless device, such as another UE 110 or the BS 105. The UE 110*a* and its components (not shown) may operate similarly as the base station 105*b* and its corresponding components.

At block 404, the method 400 may identify a first timing advance value. For example, the TA component 176 of the base station 105*b* may identify the first TA value as the RTT 370 based on the time between the transmission of SS 304 by the base station 105*a* and the reception of the SS 334 by the base station 105*b* and the time between the transmission of the RACH signal 346 by the base station 105*b* and the reception of the RACH signal 308 by the base station 105*a*. The UE 110*a* and its components (not shown) may operate similarly as the base station 105*b* and its corresponding components.

In some examples, the first TA value may be identified based on a predefined method or algorithm as described with respect to FIG. 3 above. In other examples, the first TA value may be identified based on reference signals sent by neighboring base stations 105 and UEs 110. The base station 105*a* may send one or more reference signals to the base station 105*b*. The base station 105*b* may rely on the time for the reference signals to travel from the base station 105*a* to the base station 105*b* to determine the timing advance 368. Specifically, the timing advance 368 may be twice the travelling time of the reference signals. In some examples, the first TA value may be identified based on TA values previously utilized by the base station 105*b*. Specifically, the previously utilized TA values may include TA values implemented by the base station 105*b* to transmit data (e.g., RACH signal) to the base station 105*a*, and the data was received successfully (e.g., properly decoded) by the base station 105*a*. In yet other examples, the first TA value may be identified based on the resource blocks of the RACH signal and/or the SS sent by the base station 105*a*. In particular, the base station 105*b* may utilize information in the SS, the Master Information Block (MIB), and/or the Remaining Minimum System Information (RMSI) to identify the first TA. The SS, MIB, and/or RMSI may include information such as distance between the base stations 105*a*, 105*b*, TA candidate values, and other information used to identify the first TA.

At block 406, the method 400 may transmit the RACH signal based on the first TA on a first resource to a second wireless device. For example, the communication component 170 and/or the RACH component 172 of the base station 105*b* may transmit the RACH signal with the first TA equaling to the RTT on a set of resource blocks to the base station 105*a*. Specifically, the RACH component 172 may generate the RACH signal 366, and the communication component 170 may transfer the RACH signal 366 to the RF front end and/or transceiver/transmitter of the base station 105*b*. The transceiver/transmitter may encode the RACH signal 366 and transmits the RACH signal 366 via one or more antennas. The UE 110*a* and its components (not shown) may operate similarly as the base station 105*b* and its corresponding components. In certain examples, the RACH signal may be transmitted using the second configuration having a second CP length, a second preamble length, and a second GT length. The communication component 170 of the base station 105*b* may receive the indication (via a second indication signal) of the second configuration from the base station 105*a*.

At block 408, the method 400 may optionally receive an indication of failed decoding of the RACH signal. For example, the communication component 170 of the base station 105*b* may not receive an acknowledgement (ACK) from the base station 105*a* for the RACH signal. In other examples, the communication component 170 may not receive a RACH response (RAR) within a predetermined period of time. Alternatively, the communication component 170 may receive a non-acknowledgement (NACK) from the base station 105a. In particular, the NACK may be received by one or more antennas (for wireless signals) or communication interfaces (for wired interfaces) of the base station 105b. RF front end and/or transceiver/receiver may process the received wireless/wired signals into digital data and may transfer the digital data to the modem 160 and/or the communication component 170. The UE 110a and its components (not shown) may operate similarly as the base station 105b and its corresponding components.

At block 410, the method 400 may identify a second TA value. For example, the TA component 176 may identify a second TA value. In some examples, the second TA value may be different from the first TA value. In some examples, the second TA value may be identified based on a predefined method or algorithm as described above. In other examples, the second TA value may be identified based on reference signals sent by neighboring base stations 105 and UEs 110. In some examples, the second TA value may be identified based on TA values previously utilized by the base station 105b. In yet other examples, the second TA value may be identified based on the resource blocks of the RACH signal or the SS sent by the base station 105a. In some examples, the RACH component 172 may identify the second TA value in response to identifying a failed decoding of the RACH signal sent with the first TA. The UE 110a and its components (not shown) may operate similarly as the base station 105b and its corresponding components.

At block 412, the method 400 may transmit the RACH signal based on the second TA on a second resource to the second wireless device. For example, the communication component 170 and/or the RACH component 172 of the base station 105b may transmit the RACH signal with the second TA equaling to half of the RTT on a different set of resource blocks to the first base station 105a. Specifically, the RACH component 172 may generate the RACH signal 366, and the communication component 170 may transfer the RACH signal 366 to the RF front end and/or transceiver/transmitter of the base station 105b. The transceiver/transmitter may encode the RACH signal 366 and transmits the RACH signal 366 via one or more antennas. In some examples, after the transmission of the RACH signal with the second TA, the base station 105b may join the network. Alternatively, the UE 110 may transmit the RACH signal based on the second TA on a second resource. The UE 110a and its components (not shown) may operate similarly as the base station 105b and its corresponding components. The UE 110a and its components (not shown) may operate similarly as the base station 105b and its corresponding components. In certain examples, the RACH signal may be transmitted using the second configuration having a second CP length, a second preamble length, and a second GT length. The first configuration may be different from the second configuration (i.e., CP, preamble, and/or GT have different lengths). The communication component 170 of the base station 105b may receive the indication (via an indication signal) of the second configuration from the base station 105a.

At block 414, the method 400 may optionally receive an indication of successful decoding of the RACH signal. For example, the communication component 170 of the base station 105b may receive a signal (e.g., ACK) from the base station 105a indicating that the RACH signal was decoded properly by the base station 105a. In particular, the ACK may be received by one or more antennas (for wireless signals) or communication interfaces (for wired interfaces) of the base station 105b. RF front end and/or transceiver/ receiver may process the received wireless/wired signals into digital data and may transfer the digital data to the modem 160 and/or the communication component 170. In some aspects, the base station 105b may store the RACH signal for future use. Alternatively, the UE 110 may optionally receive an indication of successful decoding of the RACH signal. The UE 110a and its components (not shown) may operate similarly as the base station 105b and its corresponding components.

In some implementations, the communication component 170 may repeatedly (periodically or non-periodically) transmit the RACH signal until receiving the indication of success decoding of the RACH signal.

Figure 5:
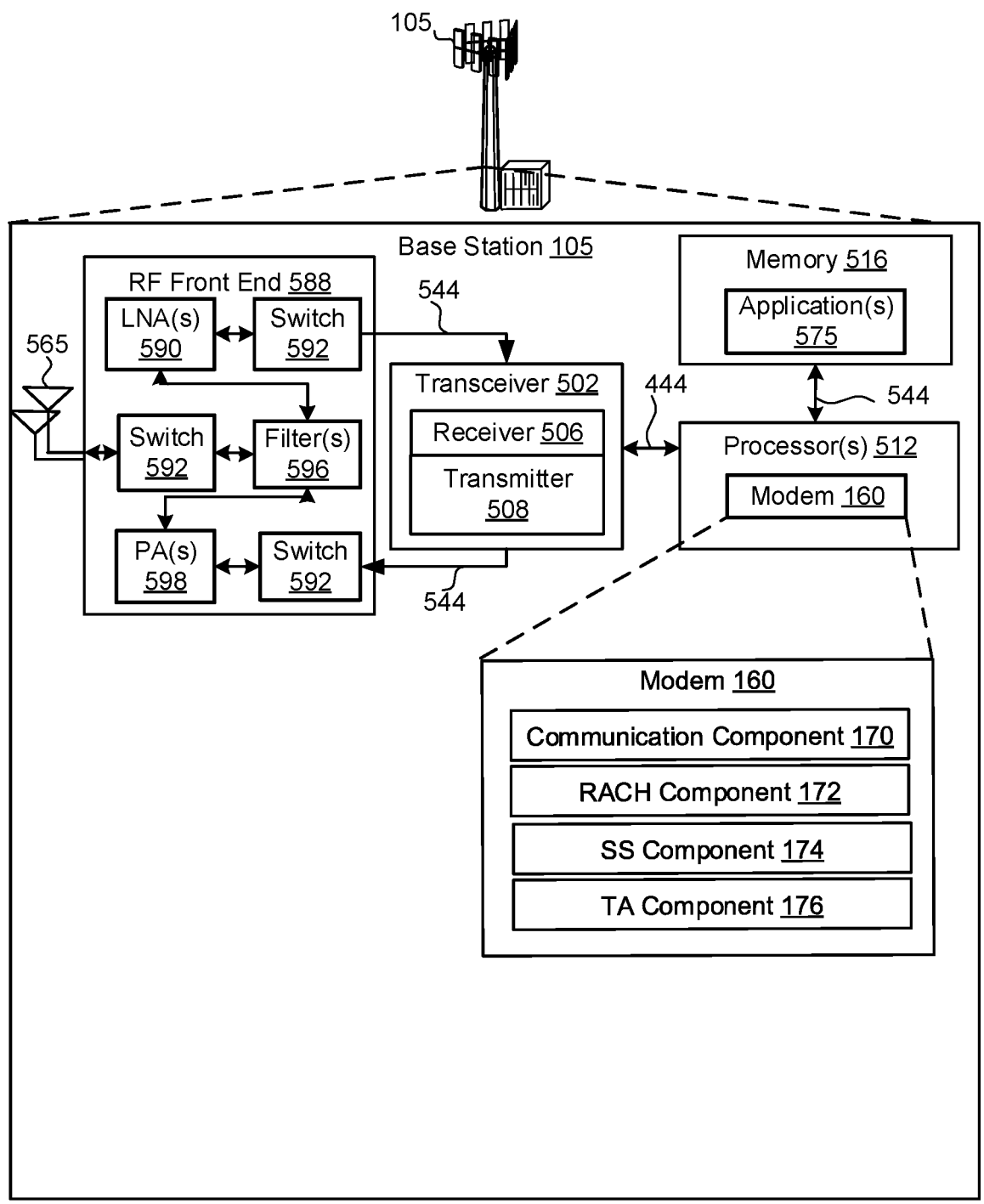
FIG. 5 is a schematic diagram of an example of a base station.

Referring to FIG. 5, one example of an implementation of the base station 105b may include a variety of components, some of which have already been described above, but including components such as one or more processors 512, memory 516 and transceiver 502 in communication via one or more buses 544, which may operate in conjunction with modem 160, the communication component 170, and the RACH component 172 to enable one or more of the functions described herein. Further, the one or more processors 512, modem 160, memory 516, transceiver 502, RF front end 588 and one or more antennas 565, may be configured to support voice and/or data calls (simultaneously or non-simultaneously) in one or more radio access technologies.

In an aspect, the one or more processors 512 may include a modem 140 that uses one or more modem processors. The various functions related to the RACH component 172 and the communication component 170 may be included in modem 160 and/or processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 160 associated with the RACH component 172 and the communication component 170 may be performed by transceiver 502.

Memory 516 may include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining the RACH component 172 and/or one or more of its subcomponents, and/or data associated therewith, when UE 110 is operating at least one processor 512 to execute the RACH component 172 and/or one or more of its subcomponents. In another aspect, for example, memory 516 may be a non-transitory computer-readable storage medium that stores one or more computer-executable codes defining the communication component 154 and/or one or more of its subcomponents, and/or data associated therewith, when the base station 105b is operating at least one processor 512 to execute the communication component 154 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one base station 105*a*. Additionally, the receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, the base station 105*b* may include RF front end 588, which may operate in communication with one or more antennas 565 and transceiver 502 for receiving and transmitting radio transmissions, for example, wireless communications transmitted by the base station 105*a* or wireless transmissions transmitted by the UE 110. The RF front end 588 may be communicatively coupled with one or more antennas 565 and may include one or more low-noise amplifiers (LNAs) 590, one or more switches 592, one or more power amplifiers (Pas) 598, and one or more filters 596 for transmitting and receiving RF signals.

In an aspect, the LNA 590 may amplify a received signal at a desired output level. In an aspect, each LNA 590 may have a specified minimum and maximum gain values. In an aspect, RF front end 588 may use one or more switches 592 to select a particular LNA 590 with a specific gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 may be used by the RF front end 588 to filter a received signal to obtain an input RF signal. Similarly, in an aspect, for example, a respective filter 596 may be used to filter an output from a respective PA 598 to produce an output signal for transmission. In an aspect, each filter 596 may be connected to a specific LNA 590 and/or PA 598. In an aspect, the RF front end 588 may use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, the transceiver 502 may be tuned to operate at specified frequencies such that base station 105*b* may communicate with, for example, one or more base stations 105 or one or more cells associated with one or more base stations 105. In an aspect, for example, the modem 160 may configure the transceiver 502 to operate at a specified frequency and power level based on the BS configuration of base station 105*b* and the communication protocol used by the modem 160.

In an aspect, the modem 160 may be a multiband-multimode modem, which may process digital data and communicate with the transceiver 502 such that the digital data is sent and received using transceiver 502. In an aspect, the modem 160 may be multiband and be configured to support multiple frequency bands for a specific communications protocol. In an aspect, the modem 160 may be multimode and be configured to support multiple operating networks and communications protocols. In an aspect, the modem 160 may control one or more components of the base station 105*b* (e.g., RF front end 588, transceiver 502) to enable transmission and/or reception of signals from the network based on a specified modem configuration. In an aspect, the modem configuration may be based on the mode of the modem and the frequency band in use. In another aspect, the modem configuration may be based on BS configuration information associated with base station 105*b* as provided by the network during cell selection and/or cell reselection.

Figure 6:
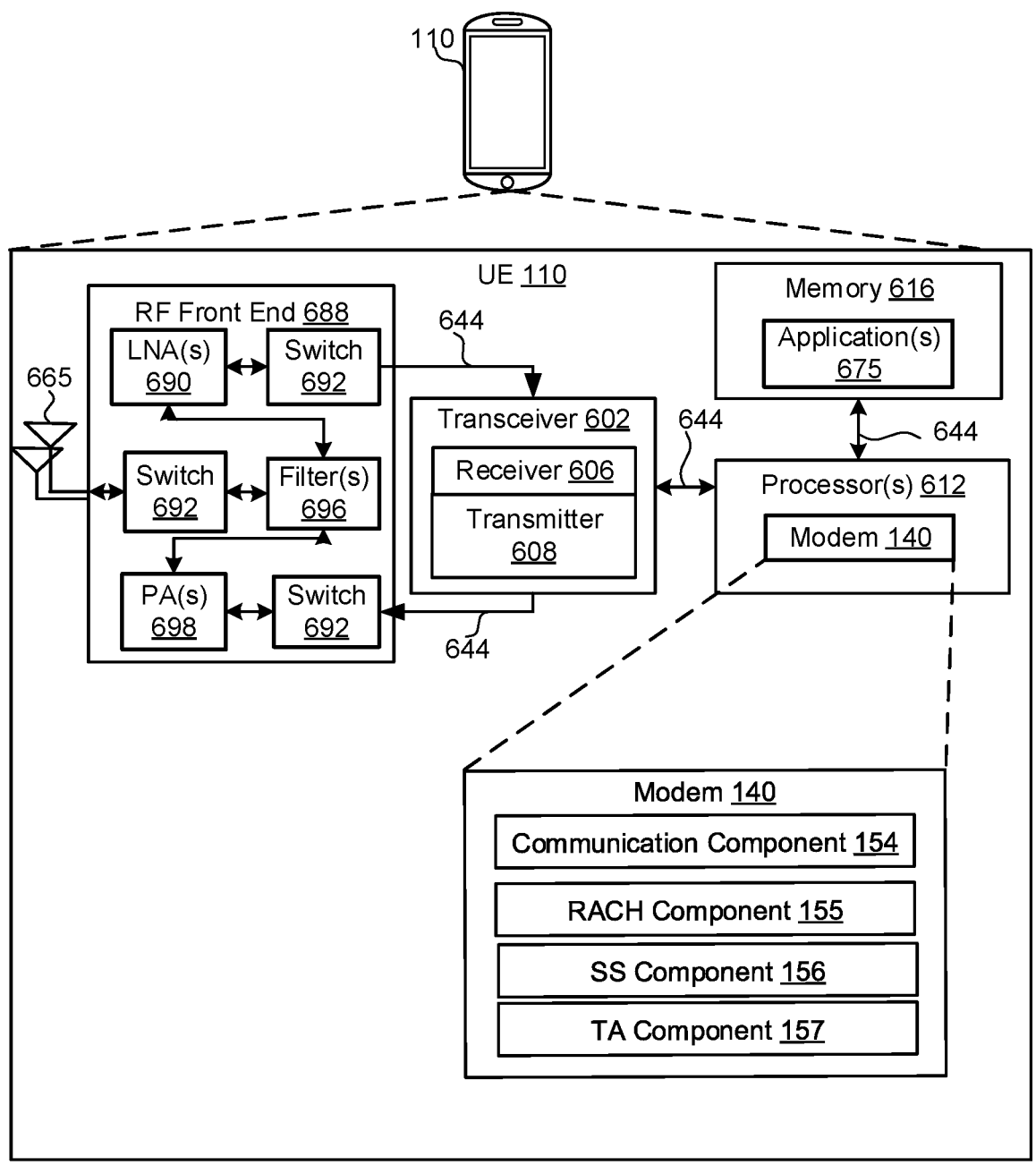
FIG. 6 is a schematic diagram of an example of a user equipment.

Referring to FIG. 6, one example of an implementation of the UE 110 may include a variety of components, some of which have already been described above in connection with FIG. 5, but including components such as one or more processors 612 and memory 616 and transmitter 602 in communication via one or more buses 644, which may operate in conjunction with modem 140 and the communication component 154 to enable one or more of the functions described herein related to receiving SS and transmitting RACH signal.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of transmitting random access channel (RACH) signals from a wireless device, comprising:
   identifying a first timing advance (TA) value;
   transmitting a RACH signal based on the first TA value on a first resource to a second wireless device during a RACH session;
   identifying a second TA value; and
   transmitting the RACH signal based on the second TA value on a second resource to the second wireless device during the RACH session.

2. The method of claim 1, further comprising repeatedly transmitting the RACH signal based on one or more new TA values until receiving an indication of a successful decoding of the RACH signal at the second wireless device.

3. The method of claim 1, further comprising storing the second TA value in a memory in response to receiving an indication of a successful decoding of the RACH signal transmitted based on the second TA value.

4. The method of claim 1, wherein the first TA value is identified based on an estimation of a round-trip time (RTT) of a previous RACH transmission to the second wireless device.

5. The method of claim 1, further comprising receiving the first TA value from a third wireless device, wherein the first TA value is identified based on a first transmission time of a reference signal sent by a third wireless device to the second wireless device and a second transmission time of a response to the reference signal received by the third wireless device.

6. The method of claim 1, wherein the first TA value is identified based on one or more TA values previously utilized for transmission.

7. The method of claim 1, wherein the first TA value is identified based on the first resource of the RACH signal and a SS that the RACH signal is sent in response to.

8. The method of claim 1, further comprising;
   identifying, after transmitting the RACH signal based on the first TA value and prior to transmitting the RACH signal based on the second TA value, a failure of decoding the RACH signal transmitted based on the first TA value, wherein transmitting the RACH signal based on the second TA value is performed in response to identifying the failure of decoding the RACH signal transmitted based on the first TA value.

9. The method of claim 1, further comprising:
   identifying a first configuration and a second configuration;
   wherein transmitting the RACH signal based on the first TA value further includes transmitting the RACH signal based on the first configuration and transmitting the RACH signal based on the second TA value further includes transmitting the RACH signal based on the second configuration.

10. The method of claim 9, wherein the first configuration and the second configuration are the same.

11. The method of claim 9, wherein the first configuration and the second configuration are different.

12. The method of claim 9, further comprising receiving, from the second wireless device, a first indication signal indicating the first configuration for the transmission of the RACH signal based on the first TA value and a second indication signal indicating the second configuration for the transmission of the RACH signal based on the second TA value.

13. A wireless device for transmitting random access channel (RACH) signals, comprising:
   a memory storing instructions;
   a transceiver; and
   one or more processors coupled to the memory and the transceiver, and configured to execute the instructions to:
      identify a first timing advance (TA) value in response;
      transmit a RACH signal based on the first TA value on a first resource to a second wireless device during a RACH session;
      identify a second TA value; and
      transmit the RACH signal based on the second TA value on a second resource to the second wireless device during the RACH session.

14. The wireless device of claim 13, wherein the one or more processors are further configured to repeatedly transmit the RACH signal based on one or more new TA values until receiving, via the transceiver, an indication of successful decoding of the RACH signal at the second wireless device.

15. The wireless device of claim 13, wherein the one or more processors are further configured to store the second TA value in the memory in response to receiving an indication of a successful decoding of the RACH signal transmitted based on the second TA value.

16. The wireless device of claim 13, wherein the first TA value is identified based on an estimation of a round-trip time (RTT) of a previous RACH transmission to the second wireless device.

17. The wireless device of claim 13, wherein:
the one or more processors are further configured to receive the first TA value from a third wireless device; and
the first TA value is identified based on a first transmission time of a reference signal sent by a third wireless device to the second wireless device and a second transmission time of a response to the reference signal received by the third wireless device.

18. The wireless device of claim 13, wherein the first TA value is identified based on one or more TA values previously utilized for transmission.

19. The wireless device of claim 13, wherein the first TA value is identified based on the first resource of the RACH signal and a SS that the RACH signal is sent in response to.

20. The wireless device of claim 13, wherein the one or more processors are further configured to:
identify, after transmitting the RACH signal based the first TA value and prior to transmitting the RACH signal based on the second TA value, a failure of decoding the RACH signal transmitted based on the first TA value, wherein transmitting the RACH signal based on the second TA value is performed in response to identifying the failure of decoding the RACH signal transmitted based on the first TA value.

21. A non-transitory computer readable medium including instructions that, when executed by one or more processors, cause the one or more processor to:
identify a first timing advance (TA) value;
transmit a random access channel (RACH) signal based on the first TA value on a first resource to a wireless device during a RACH session;
identify a second TA value; and
transmit the RACH signal based on the second TA value on a second resource to the wireless device during the RACH session.

22. The non-transitory computer readable medium of claim 21, further comprises instructions that, when executed by the one or more processors, cause the one or more processor to repeatedly transmit the RACH signal based on one or more new TA values until receiving an indication of a successful decoding of the RACH signal at the second wireless device.

23. The non-transitory computer readable medium of claim 21, further comprises instructions that, when executed by the one or more processors, cause the one or more processor to store the second TA value in a memory in response to receiving an indication of a successful decoding of the RACH signal transmitted based on the second TA value.

24. The non-transitory computer readable medium of claim 21, wherein the first TA value is identified based on at least one of an estimation of a round-trip time (RTT) of a previous RACH transmission to the second wireless device.

25. The non-transitory computer readable medium of claim 21, further comprises instructions that, when executed by the one or more processors, cause the one or more processor to receive the first TA value from a third wireless device, wherein the first TA value is identified based on a first transmission time of a reference signal sent by a third wireless device to the second wireless device and a second transmission time of a response to the reference signal received by the third wireless device.

26. The non-transitory computer readable medium of claim 21, wherein the first TA value is identified based on one or more TA values previously utilized for transmission.

27. The non-transitory computer readable medium of claim 21, wherein the first TA value is identified based on the first resource of the RACH signal and a SS that the RACH signal is sent in response to.

28. The non-transitory computer readable medium of claim 21, further comprises instructions that, when executed by the one or more processors, cause the one or more processor to identify, after transmitting the RACH signal based on the identified first configuration and the first TA value and prior to transmitting the RACH signal based on the identified second configuration and the second TA value, a failure of decoding the RACH signal transmitted based on the first TA value, wherein transmitting the RACH signal based on the second TA value is performed in response to identifying the failure of decoding the RACH signal transmitted based on the first TA value.

29. A wireless device for receiving a random access channel (RACH) signal, comprising:
a memory storing instructions;
a transceiver; and
one or more processors coupled to the memory and the transceiver, and configured to execute the instructions to:
transmit a synchronization signal at a first time to a remote wireless device, wherein the remote wireless device is a distance away from the wireless device;
search for a RACH signal during an observation window including a second time that is a delta time after the first time during a RACH session, wherein the delta time is a predetermined time interval between a receiving time indicating the remote wireless device receiving the synchronization signal from the wireless device and a scheduled time for transmitting the RACH signal to the wireless device in response to the synchronization signal; and
receive the RACH signal from the remote wireless device at the second time during the RACH session, wherein the remote wireless device sends the RACH signal a timing advance before the scheduled time.

30. The wireless device of claim 29, wherein a value of the timing advance is based on at least one of an estimation of a round-trip time (RTT) of a previous RACH transmission to the wireless device, a first transmission time of a reference signal sent by a second wireless device to the wireless device and a second transmission time of a response to the reference signal received by the second wireless device, or one or more TA values previously utilized by the remote wireless device for transmission.

* * * * *